(12) United States Patent
Kline et al.

(10) Patent No.: US 10,712,444 B1
(45) Date of Patent: Jul. 14, 2020

(54) ULTRASONIC INPUT DEVICE

(71) Applicant: Chirp Microsystems, Inc., Berkeley, CA (US)

(72) Inventors: Mitchell Kline, Berkeley, CA (US); David Horsley, Berkeley, CA (US); Richard J. Przybyla, Berkeley, CA (US)

(73) Assignee: Chirp Microsystems, Inc., Berkeley, CA (US)

( * ) Notice: Subject to any disclaimer, the term of this patent is extended or adjusted under 35 U.S.C. 154(b) by 0 days.

(21) Appl. No.: 16/165,890

(22) Filed: Oct. 19, 2018

Related U.S. Application Data

(63) Continuation of application No. PCT/US2016/029049, filed on Apr. 22, 2016.

(51) Int. Cl.
*G01S 15/00* (2020.01)
*G01S 15/89* (2006.01)
*G01S 15/66* (2006.01)

(52) U.S. Cl.
CPC ........... *G01S 15/66* (2013.01); *G01S 15/003* (2013.01); *G01S 15/89* (2013.01)

(58) Field of Classification Search
CPC ......... G01S 15/66; G01S 15/89; G01S 15/003
USPC ....................................................... 367/100
See application file for complete search history.

(56) References Cited

U.S. PATENT DOCUMENTS

| | | | |
|---|---|---|---|
| 4,026,654 A * | 5/1977 | Beaurain | G01S 17/50 356/5.07 |
| 6,115,326 A | 9/2000 | Puma et al. | |
| 7,901,358 B2 | 3/2011 | Mehi et al. | |
| 9,477,317 B1 * | 10/2016 | Clements | G06F 3/017 |
| 2007/0211022 A1 | 9/2007 | Boillot | |
| 2012/0001875 A1 | 1/2012 | Li et al. | |
| 2015/0334487 A1 * | 11/2015 | Bowers | H04R 1/40 367/138 |

FOREIGN PATENT DOCUMENTS

| WO | 2009147398 A2 | 12/2009 |
|---|---|---|
| WO | 2009147398 A3 | 2/2011 |

OTHER PUBLICATIONS

International Search Report dated Dec. 29, 2016 for International Patent Application No. PCT/US2016/029049.
Supplemental European Search Report dated Dec. 4, 2019 for European Patent Application No. 16899667.6.

* cited by examiner

*Primary Examiner* — Daniel L Murphy
(74) *Attorney, Agent, or Firm* — JDI Patent; Joshua D. Isenberg; Robert Pullman

(57) ABSTRACT

An ultrasonic input includes two or more ultrasonic transceiver units having transducers separated from each other by a predetermined spacing and a processor coupled to the transceiver units. In some implementations one unit transmits while two receive and in other implementations one unit transmits and receives while the other just receives. The transmitter sends an ultrasonic pulse and first and second receivers receive echoes of the ultrasonic pulse from an object. The processor and/or transceiver units use first and second receive signals to determine first and second time-of-flight (ToF) measurements corresponding to times between transmitting an ultrasonic pulse and receiving an echo of the ultrasonic pulse.

24 Claims, 4 Drawing Sheets

ULTRASONIC INPUT DEVICE

CLAIM OF PRIORITY

This application is a continuation of International Patent Application Number PCT/US2016/029049, filed Apr. 22, 2016, the entire disclosures of which are incorporated herein by reference.

FIELD OF THE DISCLOSURE

The present disclosure relates to ultrasonic pulse echo range finding and more specifically to ultrasonic pulse echo range using at least one ultrasonic transmitter and at least two ultrasonic receivers during a transmit/receive cycle.

BACKGROUND

Ultrasonic pulse echo rangefinding is used to detect nearby objects. Ultrasonic pulse-echo measurements bounce sound off the object and measure the time-of-flight (ToF) of the echo. The ToF can be converted into round-trip range by multiplying by the speed of sound.

If several ultrasonic transceivers are used at specific locations in space, the position of a nearby object can be determined in 2 or 3 dimensions. Using this technique, an input device can be constructed to track the location of a user's finger, for example. The position or motions of the finger can be used as a primary or alternative input mechanism for devices such as phones or wearables. Often, the same transceiver is used to transmit ultrasonic pulses and detect return echoes of those pulses. If an object is located near an ultrasonic transceiver, a transmitted ultrasonic pulse and a return echo from the object may interfere with each other. Such interference can prevent accurate ToF measurement and tracking for objects that are close to the transceiver.

It is within this context that aspects of the present disclosure arise.

BRIEF DESCRIPTION OF THE DRAWINGS

Objects and advantages of aspects of the present disclosure will become apparent upon reading the following detailed description and upon reference to the accompanying drawings in which.

DETAILED DESCRIPTION

Although the following detailed description contains many specific details for the purposes of illustration, anyone of ordinary skill in the art will appreciate that many variations and alterations to the following details are within the scope of the invention. Accordingly, the aspects of the disclosure described below are set forth without any loss of generality to, and without imposing limitations upon, the claimed invention.

In the following detailed description, reference is made to the accompanying drawings, which form a part hereof, and in which is shown by way of illustration specific embodiments in which the invention may be practiced. In this regard, directional terminology, such as "top," "bottom," "front," "back," "first," "second," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
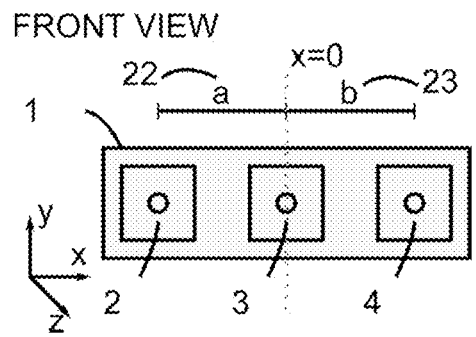
FIG. 1 is a plan view schematic diagram depicting an ultrasonic input system according to an aspect of the present disclosure.
Figure 2:
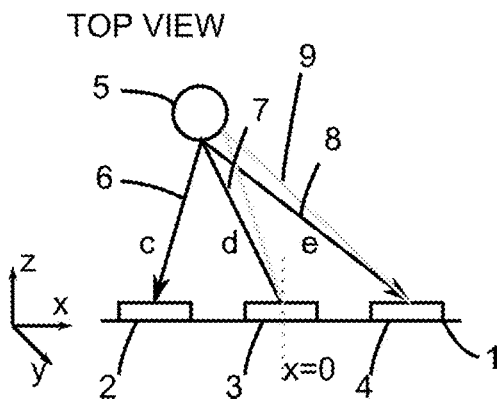
FIG. 2 is a side view schematic diagram depicting an ultrasonic input system according to an aspect of the present disclosure.
Figure 3:
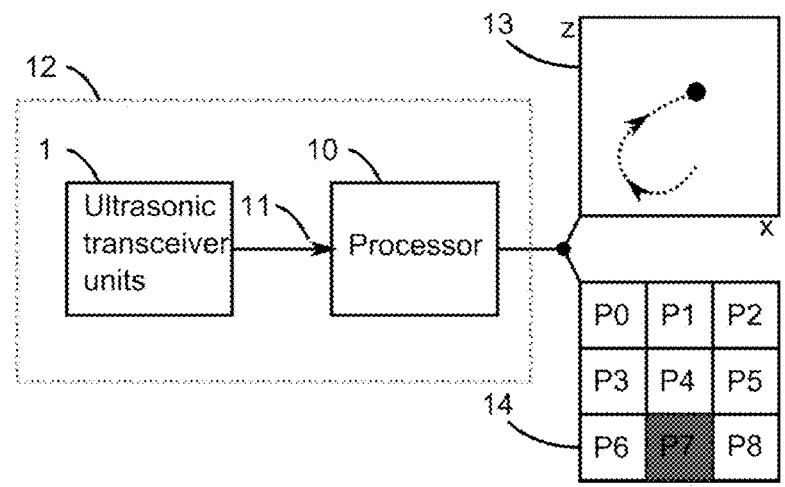
FIG. 3 is a block diagram illustrating operation of an ultrasonic input system according to an aspect of the present disclosure.

As illustrated in FIG. 1, FIG. 2, and FIG. 3, aspects of the present disclosure provide an ultrasonic input system 12 that detects the position of a target 5 relative to the system. The target is most commonly a person's finger, but could be other objects, such as a stylus or pen. The device can report continuous position information of the target 13, or alternatively, it can report a quantized representation of that position 14. The system is preferably implemented with MEMS ultrasonic transducers with application specific integrated circuits to achieve small size and low power consumption. In at least one application, the size of the individual transducer units should be less than 5×5×1.5 mm$^3$, and the total active-mode power consumption should be less than 10 mW. The standby power should be less than 60 µW.

The system described herein is compatible with wide field-of-view time-of-flight metrology and does not require phased arrays. Phased arrays require more complex signal processing, which could increase system power consumption and cost. Arrays also require precise matching of transducer elements, which increases manufacturing complexity.

According to aspects of the present disclosure an ultrasonic input system includes one or more ultrasonic transceivers 1 and a processor 10 that computes position information 13, 14 from transceiver data 11. The ultrasonic transceiver 1 includes at least two ultrasonic transducer units. The example system shown in FIG. 1, for example, includes three ultrasonic transceivers 2, 3, 4. The processor is preferably a microcontroller, optionally with common peripherals such as data converters, timers, and counters, but may also be implemented as a field programmable gate array (FPGA) or a general purpose central processing unit (CPU).

By way of example, and not by way of limitation the position information 13 computed from the transceiver data 11 may be in the form of quantized location information indicating, e.g., whether an object's location falls within a particular square within a grid. In the example shown in FIG. 3, the grid 14 is a square grid of three squares on a side. The position information 13 may identify which of the nine squares P0, P1, P2, P3, P4, P5, P6, P7, P8 corresponds to the position of the object. The processor 10 may use information identifying the square that corresponds to the position of the object to select a corresponding icon or other corresponding input value.

Figure 4:
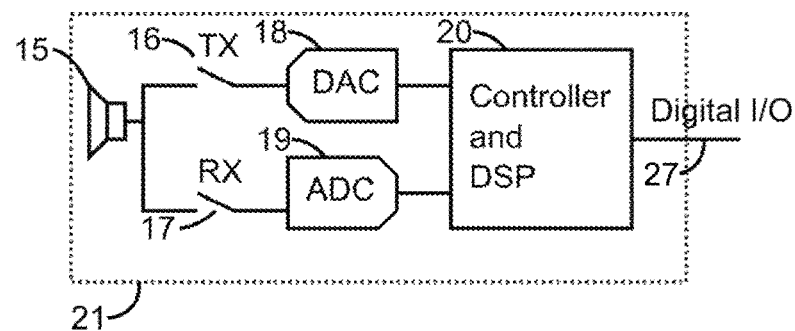
FIG. 4 is a schematic diagram of an ultrasonic transducer unit usable in an ultrasonic input system according to an aspect of the present disclosure.

FIG. 4 shows an example of an implementation of an ultrasonic transceiver 21. In this example, the ultrasonic transceiver 21 includes an ultrasonic transducer 15, transmit and receive switches 16, 17, data converters 18, 19, and signal processing and control hardware 20. The ultrasonic transducer 15 is preferably a piezoelectric micromachined ultrasonic transducer (PMUT), capable of both transmitting and receiving ultrasound. Alternatively, the transducer 15 may be a capacitive micromachined ultrasonic transducer (CMUT) capable of both transmitting and receiving ultrasound. The transmit and receive switches 16, 17 switch the transducer from a transmitter to a receiver. The DAC 16 converts digital control signals from the control unit 20 to appropriate analog levels to drive the transducer. The ADC 17 converts a transducer signal corresponding to the sound pressure received by the ultrasonic transducer 15 to a digital signal. The controller 20 includes digital signal processing (DSP) to preprocess the digital signal before leaving the transceiver 21 through a digital I/O port 27.

Figure 8:
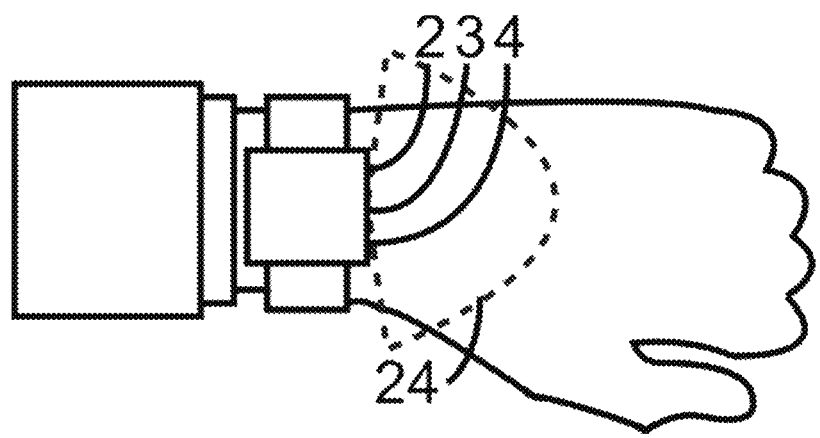
FIG. 8 schematically illustrates an example of an ultrasonic input system in which ultrasonic transducer units are mounted on a side of a case attached to a band in a manner similar to a wristwatch according to an aspect of the present disclosure.

FIG. 8 shows an example application of an ultrasonic input system according to an aspect of the present disclosure. In this application, the transceivers 2, 3, and 4 are mounted on the side of a case that is attached to a band in a manner similar to a wristwatch. The dashed area 24 represents an active area where a user can interact with the device. For example, the user can write digits or symbols on the back of their hand within the active area, e.g., using a stylus or a finger of the other hand.

According to aspects of the present disclosure, it is desirable for the device to have a wide field of view (FoV). In order to detect objects in a wide field of view, the individual transceiver units 2, 3, 4 must transmit and/or receive over a similarly sized field of view. Furthermore, to prevent dead-zones, it is desirable that the transceiver's field, of view is as wide as possible. For example, in some implementations, the individual field of view of the transceiver units may be between 60 and 180 degrees. Other implementations may require smaller or larger fields of view. As is generally known to those skilled in the acoustic arts, the width of the field of view of an acoustic transducer is mostly a function of how the transducer's acoustic port is designed. For example, for a membrane type device, if the port is a straight, narrow tube, the field of view will be relatively wide. If the port is an exponentially or conically shaped horn, the FoV will be relatively narrow compared to the field of view for a transducer with a straight narrow tube for a port.

Position Calculation

In the preferred implementation, the ultrasonic transducer units perform time-of-flight measurements in order to locate the target. Referring to FIG. 1 and FIG. 2, the central ultrasonic transceiver 3 is configured as a transmitter, and the transceivers 2 and 4 are configured as receivers. By way of example, the receiver units 2 and 4 may be implemented by microphones, e.g., MEMS microphones. Using the digital I/O 20, all three transducer units are instructed to perform their designated functions simultaneously. That is, transceiver 3 will begin a transmission at the precise time that transceivers 2 and 4 begin receiving. Because all three transceivers are synchronized to start at the same time, transceivers 2 and 4 are able to measure the time-of-flight from transducer unit 3 to transceivers 2 and 4, represented by paths 7, 6 and 7, 8, respectively. In some embodiments, transceivers 2 and 4 may be realized with ultrasonic microphones which function only as receivers and are not capable of transmitting ultrasound. Transceivers 2 and 4 measure the time-of-flight by detecting the arrival time of the ultrasonic pulse transmitted by transceiver 3. There are several techniques for computing the arrival time; the simplest approach is to find the time that the input ultrasound amplitude exceeds a certain specified threshold. The time-of-flight information is sent over the digital I/O to the processor 10.

Distances a 22, b 23, c 6, d 7, and e 8 form two triangles. To find the position of the object, we need to find the distances x and z. From the time-of-flight measurements previously described for paths 7, 6 and 7, 8, we can find the distances f=c+d and g=d+e. The distances f and g are easily computed from the time-of-flight measurements by multiplying by the speed of sound. The processor 10 calculates the position of the target using the following two equations.

$$x = \frac{-fg^2 - a^2g + f^2g + fb^2}{2bf + 2ag}$$

$$z = \sqrt{d^2 - x^2}$$

Figure 5:
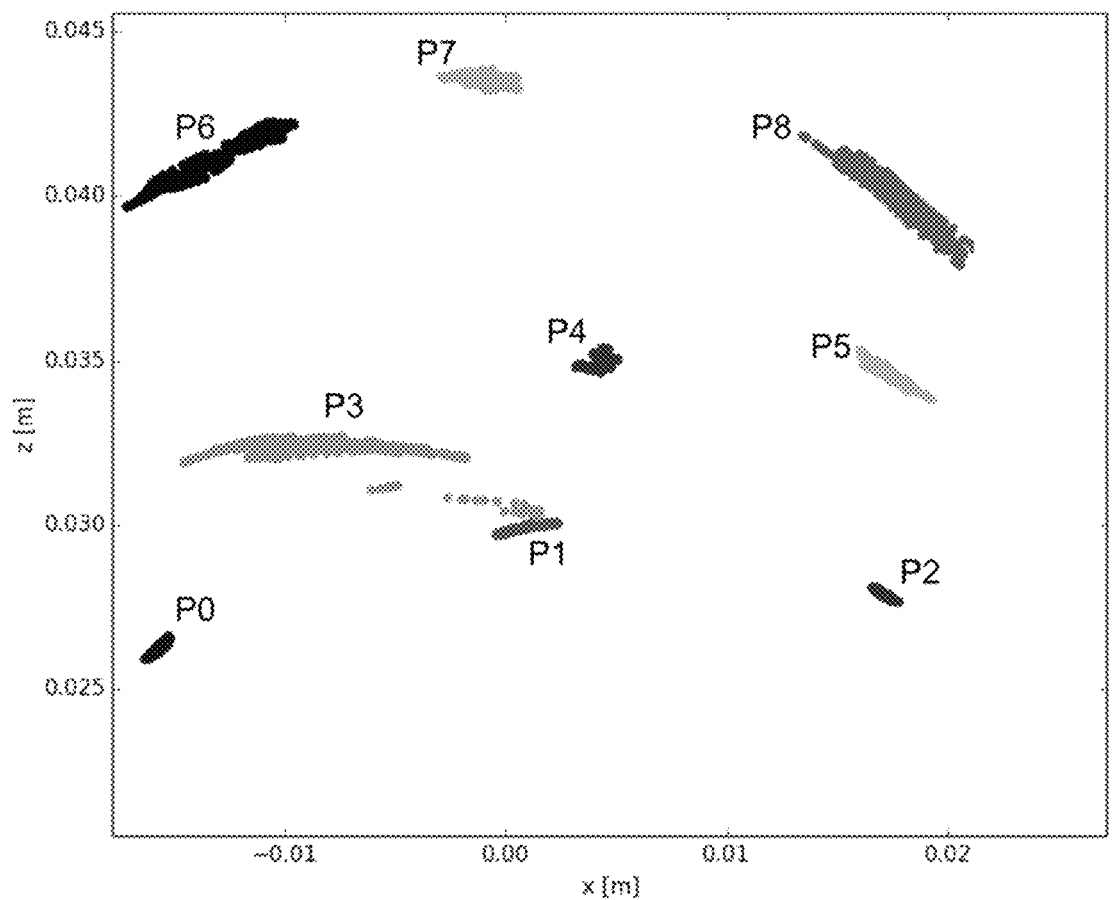
FIG. 5 is a graph showing position estimates for a finger placed at nine evenly distributed grid points using an ultrasonic input system according to an aspect of the present disclosure.

The computed x and z give a continuous target position estimate in real-time, the continuous target position estimate 13 is illustrated in FIG. 3. Unfortunately, the measurement may be corrupted by multi-path interference 9, noise, and offset, which can highly distort the position estimate. For example, FIG. 5 shows the position estimate for a finger placed at nine evenly distributed grid points. The estimated positions are clearly distorted from the ideal grid positions. Additionally, there is some overlap between the clusters of points corresponding to separate positions. Regardless, if the goal is to quantize the position information into a finite set of positions 14, there is generally sufficient separation between the clusters for accurate classification.

The classification may be performed via various algorithms including for example a supervised nearest-neighbor algorithm. In this approach, data is first collected with a target positioned in each of the supported positions; this is the training data. An example set of such data is shown in FIG. 5. The nearest neighbor algorithm works through a simple majority voting scheme. Given a two dimensional measurement point p, the processor 10 computes the n closest neighbors from the training data using the conventional two-dimensional distance formula. Using the training data, the processor determines the clusters that the closest neighbors belong to. The majority vote from the closest neighbors determines the cluster classification of point p.

Figure 6:
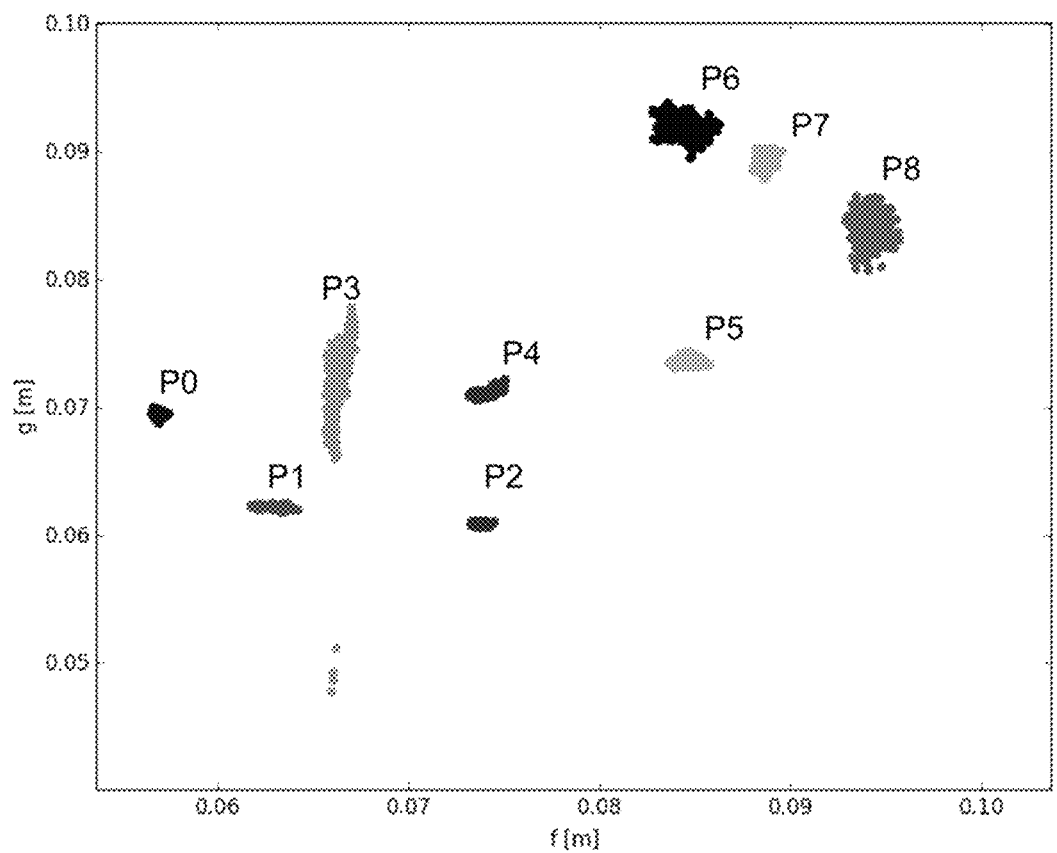
FIG. 6 is a graph showing time of flight measurements for a finger placed at nine evenly distributed grid points using an ultrasonic input system according to an aspect of the present disclosure.

For applications compatible with quantized position information, computation of x and z is not strictly necessary. The quantized position can be deduced from the path lengths f and g or, equivalently, the time-of-flight measurements recorded with transceivers 2 and 4. FIG. 6 shows the path length data for a finger placed at nine evenly distributed grid points. There is clearly sufficient separation between the clusters to perform classification. Furthermore, there is no overlap between the clusters, unlike the situation of FIG. 5. Similar to the above approach with x and z data, various algorithms may be used to classify the f and g data into quantized grid positions including for example a supervised nearest neighbor algorithm.

Short Range Performance

In at least one application, the target to be detected is in very close proximity to the ultrasonic transducers—as close as 1 mm, for example. This requirement is challenging because the ultrasonic pulse length is often longer than 1 mm due to limited transducer bandwidth. This motivates the use of separate transmitters 3 and receivers 2 and 4. The dedicated receivers 2 and 4 are able to detect the echoes returning from the target, even while transmitter 3 is active.

Direct feedthrough of the acoustic signal from the transmitter to the receivers still poses a problem, even for dedicated receivers and transmitters. There are several approaches for addressing the feedthrough problem.

The first approach is to simply ignore any targets reported at distances closer than the spacing 22, 23 between the transducers. This has the disadvantage that the minimum range is limited to be no less than the spacing between transducers (indicated schematically in FIG. 1 as a 22 and b 23).

The second approach requires an initial calibration of the background in a known environment. The ultrasonic background signal is stored in memory and subtracted from the received ultrasonic signal. This approach requires the background to be stable over long periods of time and over wide operating conditions.

The third approach is to apply a difference filter to the received ultrasonic signal. For example, a fixed-length moving average filter could be used to continuously measure the background. The length of the moving average filter should be designed to be much greater than the average length of interaction with the ultrasonic transducers. For example, if a user is drawing a circle with their finger in front of the ultrasonic transducers, and the circle takes 1 second to draw, the moving average length should be chosen much greater than 1 second. For example, the moving average length could be chosen to be 10 seconds. This insures that the background filter is not overly affected by the user's interaction. In some implementations, a moving average filter could be replaced by a fixed length impulse response (FIR) filter in order to customize the frequency response of the filter. In equivalent implementations, an infinite impulse response (IIR) filter may be used in order to reduce the computation and memory requirements of implementing a long time constant filter.

By way of example, and not by way of limitation the signal processing and control hardware 20 for each receiver may implement a moving average filter that takes a moving average of the signal from the ADC 19, continuously updates the moving average and subtracts the updated moving average from the signal from the ADC to produce a filtered signal that is used to determine the ToF measurements. Alternatively, the processor 10 may perform the moving average and subtraction. Subtracting a moving average from the receiver signal in this way can remove both direct feedthrough of the transmit pulse to the receiver and echoes from stationary targets in the field of view, e.g., user's own wrist. If the desired input from the user, for example, in the form of gestures, is short enough in duration it does not substantially affect the moving average. In this way, the desired input from the user is preserved, and the background and feedthrough are removed.

In some implementations, the moving average filter computes a moving average over a finite window of time, referred to as a moving average length. Alternatively, the moving average filter can be implemented by an infinite impulse response (IIR). In such an implementation the moving average filter implements the continuous updating and subtraction operations by taking a difference of consecutive input signals, adding that difference to a previous filtered signal, and scaling the result by a factor that sets an effective moving average length.

Image Forming

A two dimensional image may be constructed from the transceiver data through construction of a two-dimensional histogram. The histogram may be captured over a period of time appropriate to draw the image. For example, if the application requires drawing numerical digits, the histogram capture time may be set to 0.1 to 5 seconds. Over this period of time, several ToF samples are accumulated for each receiver.

Figure 7:
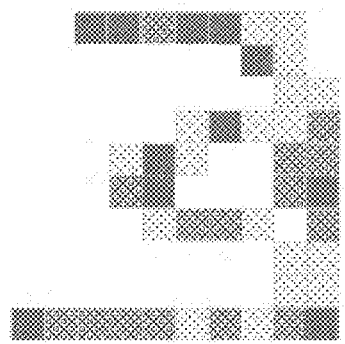
FIG. 7 is a two dimensional image constructed from time-of-flight data through construction of a two-dimensional histogram according to an aspect of the present disclosure.

Each bin of the histogram corresponds to a range of two-dimensional (e.g., x, z) location data. For example, bin 1 of the histogram contains the number of samples of position data that fall into the range (0-5 mm, 0-5 mm) and bin 2 of the histogram contains the number of samples in the range (5 mm-10 mm, 0-5 mm). If this histogram is plotted by aligning the bins along their corresponding locations in the 2D plane, the result is as shown in FIG. 7. The darker areas indicate a higher sample count in that particular histogram bin. In this particular example, the digit '3' was drawn with a finger. In some implementations, the histogram may be weighted according to the intensity of the echo waveform corresponding to the measured (x, z) position. In this implementation, the count in each bin of the histogram is replaced by the sum of the echo waveform intensities whose location fall into the bin. In this implementation, the echo waveform intensity may be weighted according to the bin's distance from the sound source. Although bins corresponding to specific coordinate ranges are described above, the two-dimensional location data may simply be a pairwise array of ToF samples for each receiver.

In certain applications such as handwriting recognition, the image should be classified to a discrete set of valid inputs. The low resolution image data can be efficiently classified using for example a trained support vector classification (SVC) algorithm. The algorithm is trained with a set of labeled training data.

The image data has some advantages over the time-series position data for applications such as handwriting recognition. First, the image removes the stroke direction information. Users can then draw strokes in the direction they prefer. Second, the image creates a uniformly sampled representation of the data in 2D space. The time series data is evenly sampled in time, not space. This makes the time series data less suitable for SVC classification.

In some implementations, the time sequence in which the position data are captured may be relevant. In such cases, the image data may include time coordinate data for each pair of location coordinates, e.g., x, z coordinates or paired ToF data for the two receivers. For such implementations, the image data is referred to herein as "path data", for convenience.

Additional Aspects

Figure 9:
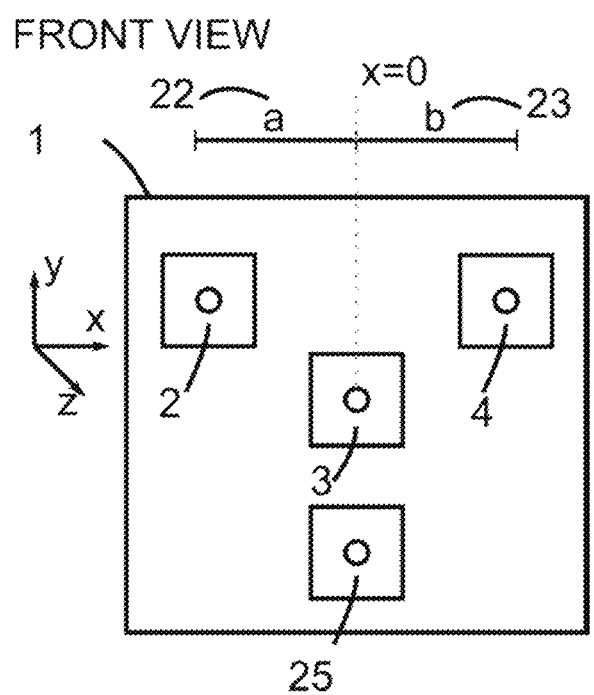
FIG. 9 is a plan view schematic diagram depicting an ultrasonic input system according to an alternative aspect of the present disclosure.

FIG. 9 shows an additional aspect of the disclosure in which one additional ultrasonic transducer unit 25 is added in order to enable calculation of a 3 dimensional position. In the preferred configuration, transducer 3 is the transmitter and transducers 2, 4, and 25 are receivers. The times-of-flight from unit 3 to 2, 3 to 4, and 3 to 25 are measured in the same manner as described for the 2-dimensional case. Using trigonometry and the known positions of the transmitter and receivers in relation to each other, a system of equations can be developed to solve for the three-dimensional position of the object.

Even without a system of equations for the three-dimensional position of the object, the three time-of-flight measurements from the transmitter unit 3 to the three receiver units 2, 4, and 25 can be used to generate a three-dimensional quantized location analogous to that described above with respect to FIG. 6. As with the two-dimensional quantized location, this can work quite well if the measurements for each quantized location are clustered together and the clusters are sufficiently separate from each other that a classification approach, such as the nearest neighbor approach described above can be applied.

Variations

Transmitter Designation

According to aspects of the present disclosure, any of the transceiver units may be designated as the transmitter and the others as receivers. In a preferred implementation, the central ultrasonic transceiver unit 3 is the designated transmitter. The central location gives even coverage to the two receivers but is not strictly required for this approach to function. It is equally valid to choose ultrasonic transceiver unit 2 or ultrasonic transceiver unit 4 as the transmitter, with the other transceiver units being receivers. Round-robin transmit strategies are also possible. In this case, the designated transmitter alternates periodically between ultrasonic transceiver units 2, 3, and 4.

Number of Required Transceiver Units

In one variation, only two ultrasonic transceiver units are required. If only two units are used, at least one of them must perform a direct pulse echo measurement. For example, if transducer 4 is omitted, either transceiver 2 or 3 must perform a direct measurement of c 6 or d 7. This is possible by switching the ultrasonic transducer unit into receive mode immediately following the transmit pulse. If transceiver 3 is used to measure the distance d directly, the x-position is found with the following formula. The z position calculation remains the same.

$$x = \frac{-d^2 + c^2 - a^2}{2a}$$

In general, more than 3 ultrasonic transceivers may be used for redundancy of calculation. This improves performance if one transceiver is periodically blocked, for example.

Alternative Transceiver Units

An alternative implementation of the ultrasonic transceiver unit 21 consists solely of the ultrasonic transducer 15. All signal processing, control, and data conversion in this case may be handled, by the processing unit 10.

A further alternative implementation of the ultrasonic transceiver unit 21 comprises the ultrasonic transducer 15 and the data converters 18 and 19. The processing unit 10 handles all signal processing and control.

While the above is a complete description of the preferred embodiments of the present invention, it is possible to use various alternatives, modifications, and equivalents. Although certain process steps appear in a certain order in the claims, the steps are not required to be carried out in order in which unless a particular order is specified. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112(f).

What is claimed is:

1. An ultrasonic input system comprising at least three ultrasonic transceiver units separated from each other by a predetermined spacing and a processor coupled to the at least three ultrasonic transceiver units, wherein at least one of the three ultrasonic transceiver units is configured to operate as a transmitter during a transmit/receive cycle and at least two of the ultrasonic transceiver units are configured as first and second receivers during the transmit/receive cycle, wherein the transmitter is configured to send an ultrasonic pulse during a transmit portion of the transmit/receive cycle and wherein the first and second receivers are configured to receive echoes of the ultrasonic pulse from an object during the transmit/receive cycle and produce corresponding first and second receive signals, wherein the processor and/or the first and second receivers are configured to determine first and second moving averages for the corresponding first and second receive signals, continuously update the first and second moving averages, subtract resulting updated first and second moving averages from the first and second receive signals, respectively, to produce first and second filtered receive signals, and determine first and second time-of-flight (ToF) measurements from the first and second filtered receive signals corresponding to times between transmitting the ultrasonic pulse by the transmitter and receiving an echo of the ultrasonic pulse by the first and second receivers, respectively.

2. The system of claim 1, wherein at least two of the at least three ultrasonic transceiver units that are configured as first and second receivers include first and second microphones.

3. The system of claim 1, wherein the processor is configured to determine location information for the object using the first and second ToF measurements.

4. The system of claim 3, wherein the location information is a quantized grid location in two or more dimensions.

5. The system of claim 3, wherein the quantized grid location is a pairwise association of the first and second ToF measurements.

6. The system of claim 3, wherein the location information includes two or more coordinates.

7. The system of claim 6, wherein the processor is configured to determine the two or more coordinates by solving equations to identify the coordinates from the first and second ToF measurements and information regarding a relative spacing of the at least three ultrasonic transceiver units.

8. The system of claim 7, wherein the two or more coordinates include two or more Cartesian coordinates.

9. The system of claim 8 wherein the two or more Cartesian coordinates are discrete quantized grid coordinates.

10. The system of claim 3, wherein the processor is configured to use the location information to select one or more corresponding input values.

11. The system of claim 10, wherein the one or more corresponding input values correspond to one or more icons.

12. The system of claim 3, wherein the processor is further configured to classify an image using the location information.

13. The system of claim 1 further comprising a wristband, wherein the at least three ultrasonic transceiver units and processor are mounted to the wristband.

14. The system of claim 13, wherein the at least three ultrasonic transceiver units include an array of at least three ultrasonic transducers arranged on a side of a structure attached to the wristband, wherein the at least three ultrasonic transceiver units and processor are mounted to the structure.

15. The system of claim 1, wherein the at least three ultrasonic transceiver units include an array of at least three ultrasonic transducers mounted on the side of an electronic device.

16. The system of claim 15, wherein the electronic device is a cellphone, keyboard, tablet, or laptop computer.

17. The system of claim 1 wherein each ultrasonic transceiver unit comprises an ultrasonic transducer, receive and transmit switches, data converters, and a control and signal processing unit.

18. The system of claim 1, wherein each of the at least three ultrasonic transceiver units includes an ultrasonic transducer.

19. The system of claim 1, wherein each of the at least three ultrasonic transceiver units includes an ultrasonic transducer and a transmit switch and a receive switch coupled between the ultrasonic transducer and the processor.

20. The system of claim 1, wherein each of the at least three ultrasonic transceiver units includes an ultrasonic transducer and one or more data converters coupled between the ultrasonic transducer and the processor.

21. The system of claim 1, wherein each of the at least three ultrasonic transceiver units includes an ultrasonic transducer, one or more data converters coupled to the ultrasonic transducers, a transmit switch and a receive switch coupled between the one or more data converters and the processor.

22. The system of claim 1, wherein each of the at least three ultrasonic transceiver units includes an ultrasonic transducer, one or more data converters coupled to the ultrasonic transducers, a transmit switch and a receive switch coupled to the one or more data converters and signal processing and control hardware between the transmit switch and the receive switch and the processor.

23. The system of claim 1, wherein the processor is configured to determine the first and second moving averages over a given window of time.

24. The system of claim 1, wherein the processor is configured to determine and continuously update the first and second moving averages and subtract the resulting updated first and second moving averages by taking a difference of consecutive input signals, adding that difference to a previous filtered signal, and scaling a result of said adding that difference by a factor that sets an effective moving average length.

* * * * *